United States Patent
Liu et al.

(10) Patent No.: US 9,928,834 B2
(45) Date of Patent: Mar. 27, 2018

(54) INFORMATION PROCESSING METHOD AND ELECTRONIC DEVICE

(71) Applicant: Lenovo (Beijing) Co., Ltd., Beijing (CN)

(72) Inventors: Ming Liu, Beijing (CN); Jianfeng Chen, Beijing (CN)

(73) Assignee: Lenovo (Beijing) Co., Ltd., Beijing (CN)

( * ) Notice: Subject to any disclaimer, the term of this patent is extended or adjusted under 35 U.S.C. 154(b) by 82 days.

(21) Appl. No.: 14/752,229

(22) Filed: Jun. 26, 2015

(65) Prior Publication Data

US 2016/0240195 A1    Aug. 18, 2016

(30) Foreign Application Priority Data

Feb. 15, 2015   (CN) .......................... 2015 1 0082818

(51) Int. Cl.
*G10L 15/22*   (2006.01)
*G10L 13/033*   (2013.01)
*G10L 21/003*   (2013.01)

(52) U.S. Cl.
CPC ............ *G10L 15/22* (2013.01); *G10L 13/033* (2013.01); *G10L 21/003* (2013.01); *G10L 2015/223* (2013.01)

(58) Field of Classification Search
CPC ..... G10L 13/033; G10L 15/22; G10L 21/003; G10L 2015/223

USPC ......................................................... 704/225
See application file for complete search history.

(56) References Cited

U.S. PATENT DOCUMENTS

| | | | |
|---|---|---|---|
| 2010/0169091 A1* | 7/2010 | Zurek .................... | G06Q 30/02 704/235 |
| 2013/0083149 A1* | 4/2013 | Hubner .............. | H04N 21/2187 348/14.02 |
| 2014/0092004 A1* | 4/2014 | Mishra .................. | G06F 1/1698 345/156 |
| 2016/0140108 A1* | 5/2016 | Lee ..................... | G06F 17/2765 715/728 |

* cited by examiner

*Primary Examiner* — Bharatkumar S Shah

(74) *Attorney, Agent, or Firm* — Harness, Dickey & Pierce, P.L.C.

(57) ABSTRACT

An information processing method is provided, which is applicable to an electronic device, where the electronic device includes a voice input and output unit, and the method includes: detecting to obtain voice information; obtaining at least one voice feature in the voice information by identifying the voice information; generating a voice operation instruction based on the voice information; determining a presentation outcome of multimedia data based on the at least one voice feature and the voice operation instruction, where the presentation outcome includes a content to be presented for the multimedia data and a presenting form for the content to be presented, and the presentation outcome matches the voice feature; and presenting the multimedia data based on the presentation outcome.

14 Claims, 5 Drawing Sheets

INFORMATION PROCESSING METHOD AND ELECTRONIC DEVICE

CROSS REFERENCE TO RELATED APPLICATION

The present application claims the priority to Chinese Patent Application No. 201510082818.7, entitled "INFORMATION PROCESSING METHOD AND ELECTRONIC DEVICE", filed on Feb. 15, 2015 with the State Intellectual Property Office of People's Republic of China, which is incorporated herein by reference in its entirety.

FIELD

The present disclosure relates to the field of electronic technology, and in particular to an information processing method and an electronic device.

BACKGROUND

With the sustainable development of the science and technology, the voice function is added to more and more electronic devices. For example, some multimedia interaction devices can reply the questions put forward by a user based on voice information from the user; or open a corresponding application program such as a movie, music or a web page based on a voice instruction from the user.

Currently, when the electronic device replies the questions put forward by the user based on the voice information from the user, the reply voices are in the same tone; and when opening a corresponding application program with the voice function, the application program, although opened based on the voice information, can not present variable content according to different voice information input by the user.

In implementing technical solutions of embodiments of the present disclosure, the inventor found there are the following technical problems:

Nowadays, when the electronic device interacts with the user using voice, voice reply information from the electronic device is in the same tone and at the same speed, resulting in bad experience for some users in the interaction with the electronic device using voice due to their ages and habits. For example, the voice reply from the electronic device can not be heard clearly, the voice reply from the electronic device can not meet an experience requirement of the user, or the tone and speed of the voice reply is boring due to lack of emotion, thereby resulting in a bad user experience and a bad interaction effect. It follows that there is a technical problem that the electronic device can not output corresponding voice reply information based on a voice feature needed by the user.

In the usage, after the electronic device opens an application program by following the voice control information, content presented by the application program is predetermined. For example, if the user opens a movie file using Chinese voice information but the initial audio track and initial subtitle of the movie are expressed in English, the user needs to reset a Chinese audio track and subtitle, resulting in a bad user experience. Therefore, there is a technical problem that the electronic device can not control the application program automatically to set a currently presented result based on the voice feature of the user.

SUMMARY

An information processing method and an electronic device are provided according to embodiments of the present disclosure, to solve a problem that corresponding voice reply information can not be output based on a voice feature needed by a user, and to achieve a technical effect that corresponding voice reply is generated based on a voice feature of the user.

In an aspect, an information processing method is provided according to the present disclosure. The method is applicable to an electronic device including a voice input/output unit. The method includes: detecting to obtain voice information; obtaining at least one voice feature in the voice information by identifying the voice information; generating a voice operation instruction based on the voice information; determining a presentation outcome of multimedia data based on the at least one voice feature and the voice operation instruction, where the presentation outcome includes a content to be presented for the multimedia data and a presenting form for the content to be presented, and the presentation outcome matches the voice feature; and presenting the multimedia data based on the presentation outcome.

Optionally, the obtaining at least one voice feature in the voice information by identifying the voice information may include: determining a first input user for the voice information based on the voice information.

Optionally, the determining a presentation outcome of multimedia data based on the at least one voice feature and the voice operation instruction may include: generating voice reply information based on the voice operation instruction, as the content to be presented; and setting a first output user for the voice reply information to be the first input user or a second input user corresponding to the first input user, where the first input user or the second input user is taken as the presenting form.

Optionally, the obtaining at least one voice feature in the voice information by identifying the voice information may include: determining, based on the voice information, an age feature of a first user inputting the voice information.

Optionally, the determining a presentation outcome of multimedia data based on the at least one voice feature and the voice operation instruction may include: generating voice reply information based on the voice operation instruction, as the content to be presented; and setting a voice speed for the voice reply information to be a first voice speed corresponding to the age feature, as the presenting form.

Optionally, the determining a presentation outcome of multimedia data based on the at least one voice feature and the voice operation instruction may include: generating subtitle information based on the voice operation instruction, as the content to be presented; and setting a subtitle display parameter for the subtitle information to be a first subtitle display parameter corresponding to the age feature, as the presenting form.

Optionally, the obtaining at least one voice feature in the voice information by identifying the voice information may include: determining, based on the voice information, a gender feature of a first user inputting the voice information.

Optionally, the determining a presentation outcome of multimedia data based on the at least one voice feature and the voice operation instruction may include: generating voice reply information based on the voice operation instruction, as the content to be presented; and setting timbre for the voice reply information to be first timbre corresponding to the gender feature, as the presenting form.

Optionally, the determining a presentation outcome of multimedia data based on the at least one voice feature and the voice operation instruction may include: generating voice reply information based on the voice operation instruction, as the content to be presented; and setting a first output user corresponding to the voice reply information to be a preset output user corresponding to the gender feature.

Optionally, the obtaining at least one voice feature in the voice information by identifying the voice information may include: determining a language type for the voice information based on the voice information.

Optionally, the determining a presentation outcome of multimedia data based on the at least one voice feature and the voice operation instruction may include: determining, based on the language type and the voice operation instruction, an adapter file matching the language type.

Optionally, the determining, based on the language type and the voice operation instruction, an adapter file matching the language type may include: obtaining a voice file and/or a subtitle file based on the voice operation instruction, as the content to be presented, where the voice file and/or the subtitle file matches the language type.

Optionally, the obtaining a voice file and/or a subtitle file based on the voice operation instruction may include: obtaining a video voice file and/or a video subtitle file of a video, in the case that the voice operation instruction is a first voice operation instruction for playing the video; obtaining a music subtitle file of music, in the case that the voice operation instruction is a second voice operation instruction for playing the music; or obtaining a web page subtitle file of a web page, in the case that the voice operation instruction is a third voice operation instruction for opening the web page.

In another aspect, an electronic device is provided according to the present disclosure. The electronic device includes: a voice input/output unit; a voice information detecting unit, configured to detect to obtain voice information; a processing unit, configured to obtain at least one voice feature in the voice information by identifying the voice information, generate a voice operation instruction based on the voice information, and determine a presentation outcome of multimedia data based on the at least one voice feature and the voice operation instruction, where the presentation outcome includes a content to be presented for the multimedia data and a presenting form for the content to be presented, and the presentation outcome matches the voice feature; and a multimedia data output unit, configured to present the multimedia data based on the presentation outcome.

Optionally, the processing unit may be configured to determine a first input user for the voice information based on the voice information.

Optionally, the processing unit may be configured to generate voice reply information based on the voice operation instruction, as the content to be presented; and to set a first output user for the voice reply information to be the first input user or a second input user corresponding to the first input user, where the first input user or the second input user is taken as the presenting form.

Optionally, the processing unit may be configured to determine, based on the voice information, an age feature of a first user inputting the voice information.

Optionally, the processing unit may be configured to generate voice reply information based on the voice operation instruction, as the content to be presented; and to set a voice speed for the voice reply information to be a first voice speed corresponding to the age feature, as the presenting form.

Optionally, the processing unit may be configured to generate subtitle information based on the voice operation instruction, as the content to be presented; and to set a subtitle display parameter for the subtitle information to be a first subtitle display parameter corresponding to the age feature, as the presenting form.

Optionally, the processing unit may be configured to determine, based on the voice information, a gender feature of a first user inputting the voice information.

Optionally, the processing unit may be configured to generate voice replay information based on the voice operation instruction, as the content to be presented; and to set timbre for the voice reply information to be first timbre corresponding to the gender feature, as the presenting form.

Optionally, the processing unit may be configured to generate voice reply information based on the voice operation instruction, as the content to be presented; and to set a first output user corresponding to the voice reply information to be a preset output user corresponding to the gender feature.

Optionally, the processing unit may be configured to determine a language type for the voice information based on the voice information.

Optionally, the processing unit may be configured to determine, based on the language type and the voice operation instruction, an adapter file matching the language type.

Optionally, the processing unit may be configured to obtain a voice file and/or a subtitle file based on the voice operation instruction, as the content to be presented, where the voice file and/or the subtitle file matches the language type.

Optionally, the processing unit may be configured to obtain a video voice file and/or a video subtitle file of a video, in the case that the voice operation instruction is a first voice operation instruction for playing the video; obtain a music subtitle file of music, in the case that the voice operation instruction is a second voice operation instruction for playing the music; or obtain a web page subtitle file of a web page, in the case that the voice operation instruction is a third voice operation instruction for opening the web page.

At least one or more of the following technical effects and advantages may be achieved by one or more technical solutions of embodiments of the present disclosure:

With the above technical solutions of embodiments of the present disclosure, the voice feature of the user can be identified and a personalized presenting effect may be generated for the user based on the identified voice feature. Compared to a technical solution that the electronic device can only generate a relative fixed presenting effect, resulting in a bad experience and a bad interaction effect when the user uses the electronic device, the technical solutions according to the present disclosure can efficiently solve a problem that corresponding voice reply information can not be output based on a voice feature needed by a user, and can achieve a technical effect that corresponding voice replay is generated based on the voice feature of the user.

With the technical solutions of embodiments of the present disclosure, the voice feature of the user can be identified and a corresponding content is generated based on the identified voice feature. Compared to a technical solution that the electronic device can only generate a specified content based on a voice instruction, the technical solutions of the present disclosure can efficiently solve a technical problem that the electronic device can not automatically control an application program to set the presentation outcome based on the voice feature of the user, and can achieve a technical effect that the electronic device automatically controls to set the presentation outcome based on the identified voice feature.

DETAILED DESCRIPTION OF THE EMBODIMENTS

Figure 1:
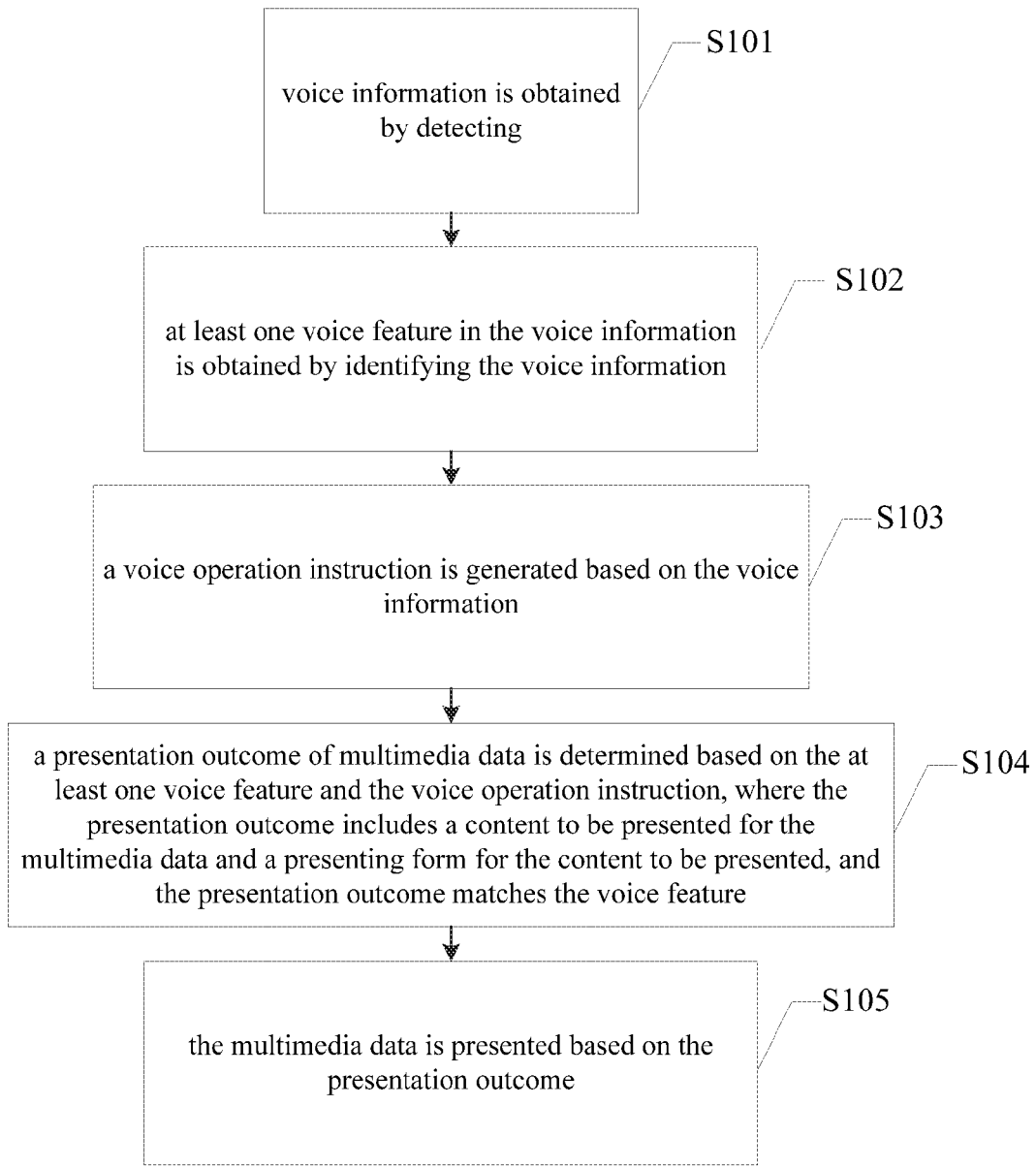
FIG. 1 is a flowchart of an information processing method according to an embodiment of the present disclosure.

An information processing method and an electronic device are provided according to embodiments of the present disclosure, to solve a problem that corresponding voice reply information can not be output based on a voice feature needed by a user, and to achieve a technical effect that corresponding voice replay is generated based on the feature of the voice of the user.

In order to solve the above technical problems, a general idea of technical solutions according to embodiments of the present disclosure is as follows: an information processing method applied to an electronic device is provided, where the electronic device includes a voice input/output unit, and the method includes: detecting to obtain voice information; obtaining at least one voice feature in the voice information by identifying the voice information; generating a voice operation instruction based on the voice information; determining a presentation outcome of multimedia data based on the at least one voice feature and the voice operation instruction, where the presentation outcome includes a content to be presented for the multimedia data and a presenting form for the content to be presented, where the presentation outcome matches the voice feature; and presenting the multimedia data based on the presentation outcome.

With the above technical solutions of embodiments of the present disclosure, the voice feature of the user can be identified and a personalized presenting effect may be generated for the user based on the identified voice feature. Compared to a technical solution that the electronic device can only generate a relative fixed presenting effect, resulting in a bad experience and a bad interaction effect when the user uses the electronic device, the technical solutions according to the present disclosure can efficiently solve a problem that corresponding voice reply information can not be output based on a voice feature needed by a user, and can achieve a technical effect that corresponding voice replay is generated based on the voice feature of the user.

In order to make the above technical solutions to be understood better, hereinafter the technical solutions of the present disclosure are illustrated in detail in conjunction with the drawings and specific embodiments. It should be understood that embodiments of the present disclosure and specific features in the embodiments are used to illustrate technical solutions of the present disclosure in detail rather than limit the technical solutions of the present disclosure. Embodiments of the present disclosure and technical solutions in the embodiments may be combined each other if there is no conflict.

A First Embodiment

In order to make those skilled in the art to understand technical solutions in an embodiment of the present disclosure clearly and completely, in the description below it is assumed that the electronic device is a multimedia interaction device for example. Hereinafter a method according to the embodiment of the present disclosure is introduced in conjunction with an example.

FIG. 1 shows an information processing method according to the first embodiment of the present disclosure. The method includes step S101 to step S105.

In step S101, voice information is obtained by detecting.

In step S102, at least one voice feature in the voice information is obtained by identifying the voice information.

In step S103, a voice operation instruction is generated based on the voice information.

In step S104, a presentation outcome of multimedia data is determined based on the at least one voice feature and the voice operation instruction, where the presentation outcome includes a content to be presented for the multimedia data and a presenting form for the content to be presented, and the presentation outcome matches the voice feature.

In step S105, the multimedia data is presented based on the presentation outcome.

Figure 2:
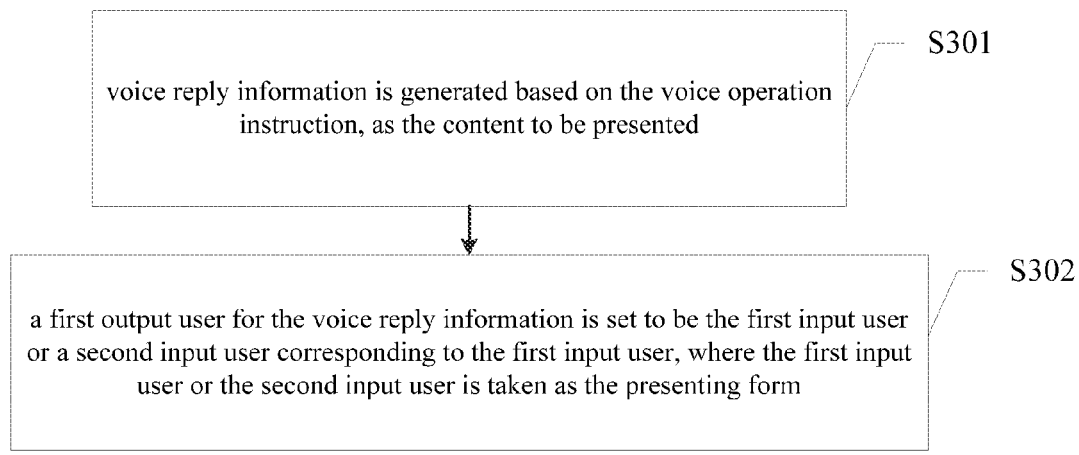
FIG. 2 is a flowchart of a first implementing way for step 104 in the information processing method according to an embodiment of the present disclosure.

Furthermore, referring to FIG. 2, in the case that the at least voice feature is a first input user for the voice information, step S104 may include step S301 and step S302 in the following.

In step S301, voice reply information is generated based on the voice operation instruction, as the content to be presented.

In step S302, a first output user for the voice reply information is set to be the first input user or a second input user corresponding to the first input user, where the first input user or the second input user is taken as the presenting form.

Figure 3:
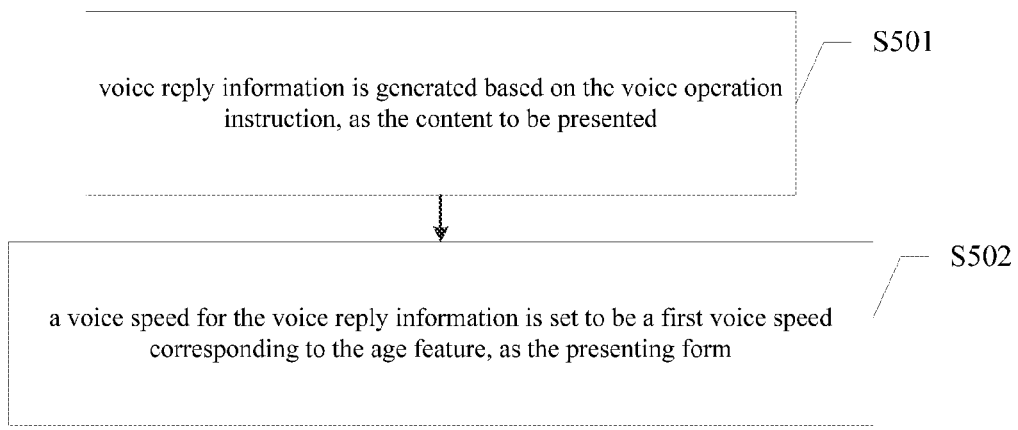
FIG. 3 is a flowchart showing a first case of a second implementing way for step 104 in the information processing method according to an embodiment of the present disclosure.

Furthermore, referring to FIG. 3, in the case that the at least one voice feature is an age feature of a first user inputting the voice information, step S104 may include step S501 and step S502 in the following.

In step S501, voice reply information is generated based on the voice operation instruction, as the content to be presented.

In step S502, a voice speed for the voice reply information is set to be a first voice speed corresponding to the age feature, as the presenting form.

Figure 4:
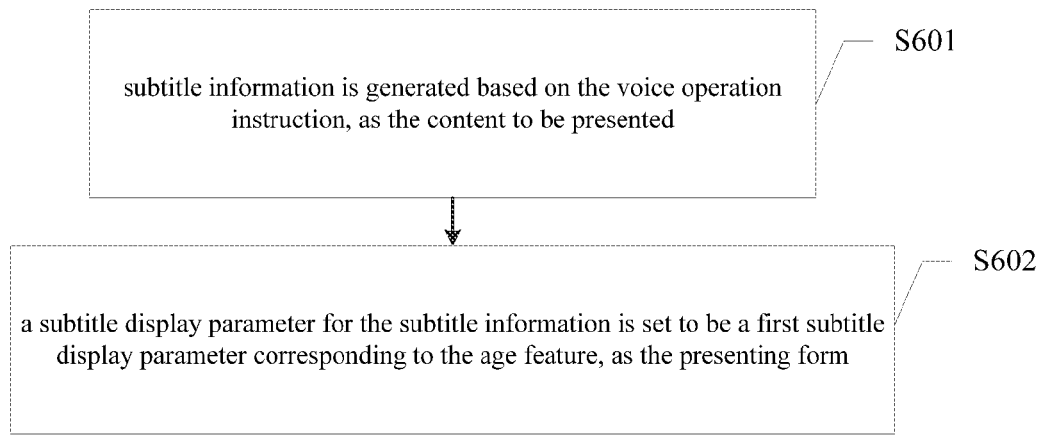
FIG. 4 is a flowchart showing a second case of the second implementing way for step 104 in the information processing method according to an embodiment of the present disclosure.

Furthermore, referring to FIG. 4, in the case that the at least one voice feature is an age feature of a first user inputting the voice information, step S104 may include step S601 and step S602 in the following.

In step S601, subtitle information is generated based on the voice operation instruction, as the content to be presented.

In step S602, a subtitle display parameter for the subtitle information is set to be a first subtitle display parameter corresponding to the age feature, as the presenting form.

Figure 5:
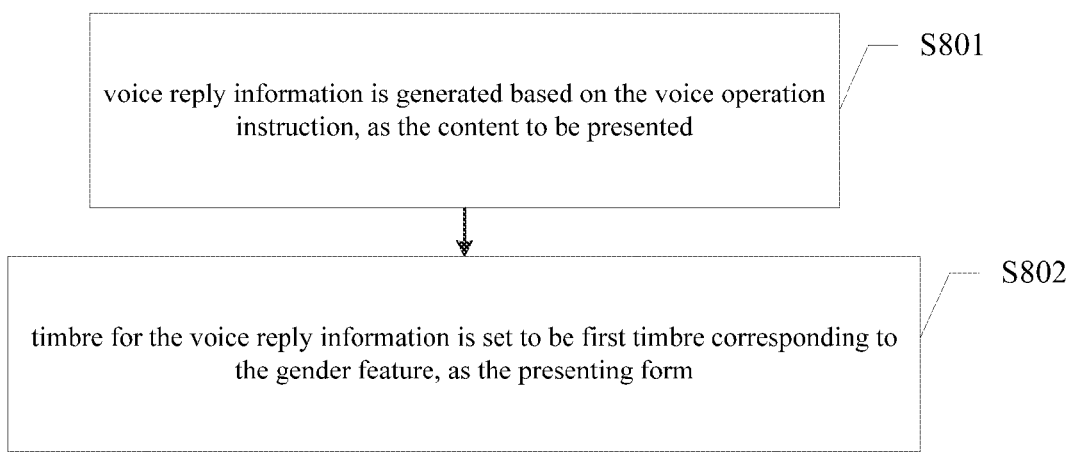
FIG. 5 is a flowchart showing a first case of a third implementing way for step 104 in the information processing method according to an embodiment of the present disclosure.

Furthermore, referring to FIG. 5, in the case that the at least one voice feature is a gender feature of a first user inputting the voice information, step S104 may include step S801 and step S802 in the following.

In step S801, voice reply information is generated based on the voice operation instruction, as the content to be presented.

In step S802, timbre for the voice reply information is set to be first timbre corresponding to the gender feature, as the presenting form.

Figure 6:
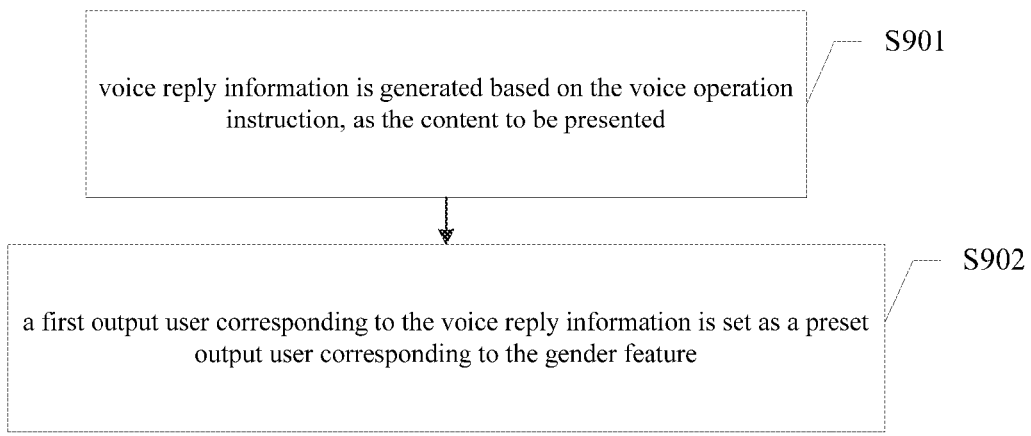
FIG. 6 is a flowchart showing a second case of the third implementing way for step 104 in the information processing method according to an embodiment of the present disclosure.

Furthermore, referring to FIG. 6, in the case that the at least one voice feature is a gender feature of the first user inputting the voice information, step S104 may include step S901 and step S902 in the following.

In step S901, voice reply information is generated based on the voice operation instruction, as the content to be presented.

In step S902, a first output user corresponding to the voice reply information is set as a preset output user corresponding to the gender feature.

Figure 7:
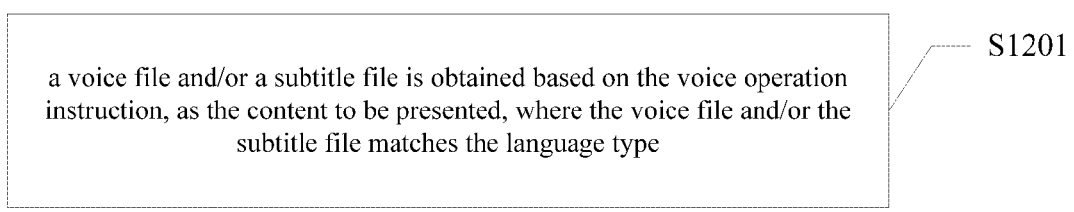
FIG. 7 shows an implementing way for step 102 in the information processing method according to an embodiment of the present disclosure.

Furthermore, referring to FIG. 7, in the case that the at least one voice feature is a language type for the voice information, step S104 may include step S1201. In step S1201, a voice file and/or a subtitle file is obtained based on the voice operation instruction, as the content to be presented, where the voice file and/or the subtitle file matches the language type.

Figure 8:
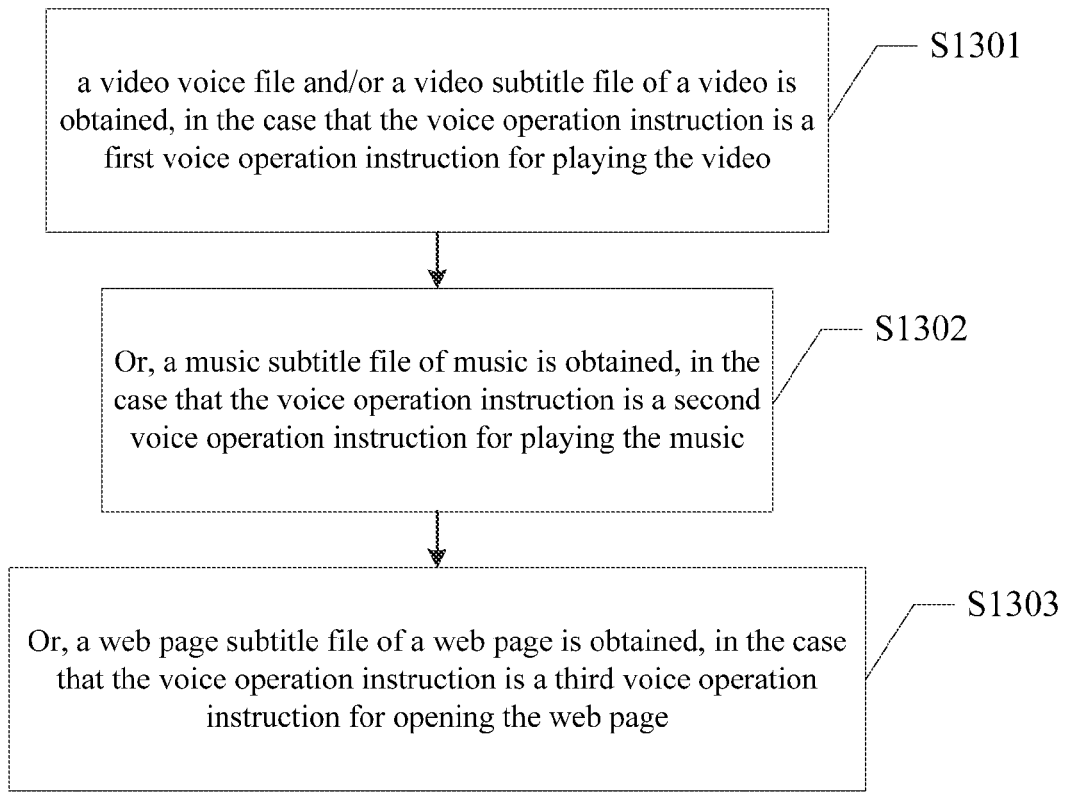
FIG. 8 is a flowchart of a fourth implementing way for step 104 in the information processing method according to an embodiment of the present disclosure.

Furthermore, referring to FIG. 8, step S1201 may include step S1301, step S1302 or step S1303 in the following.

In step S1301, a video voice file and/or a video subtitle file of a video is obtained, in the case that the voice operation instruction is a first voice operation instruction for playing the video.

In step S1302, a music subtitle file of music is obtained, in the case that the voice operation instruction is a second voice operation instruction for playing the music.

In step S1303, a web page subtitle file of a web page is obtained, in the case that the voice operation instruction is a third voice operation instruction for opening the web page.

Hereinafter a specific implementing process for the information processing method in the embodiment of the present disclosure is described by specific examples.

A multimedia interaction electronic device at user A's home, which is similar to an interaction flat television, may interact with the user A or other persons via voice instructions of the user A or other persons. Hereinafter specific cases of interaction are described in detail.

In a first implementing way, the user A sends a voice instruction to the electronic device. For example, the user A is the host in this family, and he asks the electronic device "What's the whether like today?" The electronic device performs step S101: detecting to obtain voice information. Using the above example again, the electronic device collects the voice information via an internal audio collector. After step S101 is performed, step S102 is performed: obtaining at least one voice feature in the voice information by identifying the voice information. Specifically, the electronic device determines a first input user for the voice information based on the voice information. Using the above example again, the electronic device identifies that the voice information is sent from the host user A of the family.

Specifically, firstly voices of various users of the family are recorded to a server, voice frequency and sound wave feature of each user is analyzed, and it is identified based on these features that the voice information is sent from the host of the family. In practice, more specific analysis processes are not limited herein, and those skilled in the art may adopt different methods based on actual cases.

After step S102 is performed, step S103 is performed: generating a voice operation instruction based on the voice information. Using the above example again, a processing unit in the electronic device generates an instruction for searching for and downloading weather information from a network based on the voice output from the user A.

After step S103 is performed, step S104 is performed: determining a presentation outcome of multimedia data based on the at least voice feature and the voice operation instruction. In this case, the electronic device firstly performs step S301: generating voice reply information based on the voice operation instruction, as the content to be presented. Using the above example again, in this case, the electronic device generates voice reply based on the previously obtained weather information, for example: "today, Beijing's temperature ranges from 0 degrees Celsius to 13 degrees Celsius, north wind ranges from level 4 to level 5".

After step S301 is performed, step S302 is performed: setting a first output user for the voice reply information to be the first input user or a second input user corresponding to the first input user, as the presenting form. Using the above example again, since the electronic device identifies that the question is put forward by the host user A of the family, the electronic device outputs the voice reply information at a voice imitating a hostess user B of the family. In practice, if it is identified that the question is put forward by a stranger, it may be set that the voice reply information is output at the voice imitating voice of the user A or at other voice, which is not limited here. In addition, beyond generating voice reply information, the electronic device also recommends some information for the identified user particularly. For example, if the user A watched a football match previously, the electronic device will also recommend some news on football for the user A.

After step S104 is performed, step S105 is performed: presenting the multimedia data based on the presentation outcome. Using the above example again, the electronic device outputs the voice reply information; in this way, once the host user A asks a question, the electronic device replies by imitating the hostess user B, thereby improving interaction experience effect greatly.

In a second implementing way, beyond identifying whether the user is a member of the family, the electronic device may also generate reply information by identifying an age feature from the voice of the user. Specifically, if the user A is 30 years old, the user B is 6 years old, and a user C is 55 years old, and it is assumed that the user B asks the electronic device that "where is the cinema?"; the electronic device firstly performs step S101: detecting to obtain voice information, i.e., the electronic device collects the foregoing voice information via a voice collecting unit.

After step S101 is performed, step S102 is performed: obtaining at least one voice feature in the voice information by identifying the voice information. Specifically, the electronic device determines, based on the voice information, an age feature of a first user inputting the voice information. Using the above embodiment again, the electronic device identifies that the voice information is sent from a 6 years old child. The voice may be identified by extracting a tone and a voice frequency from the voice and utilizing technology related to voice processing; also it is possible to identify the age of the person who sends the voice signal by collecting information of users in multiple age groups and performing self-learning. Specific identification ways are not limited here.

After step 102 is performed, step S103 is performed: generating a voice operation instruction based on the voice information. Using the above example again, the electronic device identifies the voice information and determines that the voice information is the user's inquiry on routes to the cinema, and the electronic device generates an operation instruction for searching for routes to the cinema.

After step S103 is performed, step S104 is performed. Specifically, firstly step S501 is performed: generating voice reply information based on the voice operation instruction, as the content to be presented. Using the above example again, since the voice information relates to inquiry on routes to the cinema, the electronic device generates voice reply information in response to the voice.

After step S501 is performed, step S502 is performed: setting a voice speed for the voice reply information to be a first vice speed corresponding to the age feature, as the presenting form. Using the above example again, since it is identified that the voice information is sent from a 6 years old child, the electronic device sets the voice speed for the voice reply information as a low speed for replying, such that the child can hear completely and clearly. In practice, in the case that it is determined that the voice information is sent from an old man for example the user C, the electronic device adjusts volume in the voice reply information appropriately for replying, such that the old-aged user can hear the voice reply information clearly. In addition, beyond generating corresponding voice reply information, the electronic device may also reply the question of the user by other ways. For example, in the case that it is identified that the question is asked by a 6 years old child, the electronic device may present the voice reply information by an animation, in this way the child may know content in the voice reply information profoundly and such an interaction way is more interesting.

In practice, in order to improve experience for the user, after step S103 is performed, step S601 is performed: generating subtitle information based on the voice operation instruction, as the content to be presented. Using the above example again, in response to the inquiry on routes to the cinema, the electronic device generates prompt information indicating a specific route, for example "firstly turn left at the first intersection, then turn right at the second intersection and walk for 100 meters".

After step S601 is performed, step S602 is performed: setting a subtitle display parameter for the subtitle information to be a first subtitle display parameter corresponding to the age feature, as the presenting form. Using the above example again, since it is identified that the voice information is sent from a 6 years old child, the electronic device may enlarge a font of the subtitle and present the subtitle in multiple colors so as to attract the user B. In practice, in the case that it is identified that the voice information is sent from an old man for example the user C, the electronic device may present the subtitle in a bold font, such that the old man can see clearly, and specific ways are not limited here. In addition, beyond generating the above subtitle prompting information, the electronic device may also generate information on landmark buildings. For example, in the case that it is identified the user is a child, the electronic device may prompt the child a dessert shop near the destination while generating the route information; and in the case that it is identified the user is an old man, the electronic device may prompt the old man an old building near the destination while generating the route information.

After either of step S502 and step S602 is performed, step S105 is performed: presenting the multimedia data based on the presentation outcome. Using the above example, the above effect is presented via the above multimedia interaction electronic device.

In a third implementing way, beyond generating reply information by identifying an age feature from the voice of the user, the electronic device may also generate reply information by identifying a gender feature from the voice of the user. Specifically, it is assumed that the user A is male, and the user B is female. In this case, a user asks the electronic device: "What is on the television tonight?"; and the electronic device performs step S101: detecting to obtain voice information. Using the above example again, the electronic device collects the voice information via the voice collecting unit.

After step S101 is performed, step S102 is performed: obtaining at least one voice feature in the voice information by identifying the voice information. Specifically, the electronic device determines, based on the voice information, a gender feature of a first user inputting the voice information. Using the above example again, the electronic device identifies using technology related to voice identifying that the voice information is sent from a male user. Specifically, it may be identified by extracting certain features for example a tone and a voice frequency from the voice information, and it is determined whether the voice information is input from a male or a female. In practice, specific implementing ways are not limited in the present disclosure.

After step S102 is performed, step S103 is performed: generating a voice operation instruction based on the voice information. Since the voice question relates to the television program on the current day, an instruction for searching for television programs is generated.

After step S103 is generated, step S104 is performed. Specifically, firstly step S801 is performed: generating voice reply information based on the voice operation instruction, as the content to be presented. Using the above example again, based on the above instruction, the electronic device generates a voice instruction, for example "19:00 CCTV News; 19:00 Total Football".

After step S801 is performed, step S802 is performed: setting timbre for the voice reply information to be first timbre corresponding to the gender feature, as the presenting form. Using the above example again, in the case that it is determined that the voice information is input from a male user, the electronic device may set the timbre for the voice replay information as timbre liked by the male user, for example a female voice, or a male voice.

In practice, after the electronic device detects that the voice information is in male voice, the electronic device may also perform step S901: generating voice reply information based on the voice operation instruction, as the content to be presented. Using the above example again, voice reply information is generated based on the voice information; in practice, other information, for example a picture or a video, may also be generated beyond the voice reply information, which is not limited here.

After step S901 is performed, step S902 is performed: setting a first output user corresponding to the voice reply information to be a preset output user corresponding to the gender feature. Using the above example again, in case of detecting that the voice information is input by a male user, the electronic device may set an output sound of the voice reply information as a sound of a female star or a sound of a male star liked by the male user, and a picture or a video of the star may also be presented.

After either of step S802 or step S902 is performed, the electronic device performs step S105: presenting the multimedia data based on the presentation outcome. Using the above example again, the presenting effect is presented via the above electronic device.

In a fourth implementing way, beyond generating reply information by identifying the gender feature from the voice of the user, the electronic device may also generate reply information by identifying a language type of the voice of the user. Specifically, it is assumed the user A is a Chinese and can speak Mandarin fluently; and the user sends voice information to the electronic device "play the movie Avatar". In practice, there may be other voice information, for example, "play a song Grandiose", "open homepage of Sina" and so on. The electronic device performs step S101: detecting to obtain voice information. Using the above example again, the electronic device collects the voice information via an internal audio collector.

After step S101 is performed, step S102 is performed: obtaining at least one voice feature in the voice information by identifying the voice information. Specifically, the electronic device determines a language type for the voice information based on the voice information. Using the above example again, the electronic device identifies that the voice information from the user A is in Chinese. The language type for the voice information may be identified by extracting a vocal feature of the user and a vocal feature for some words.

After step S102 is performed, step S103 is performed: generating a voice operation instruction based on the voice information. Using the above example again, a processing unit in the electronic device generates an instruction for playing a movie based on the voice output from the user A. In practice, for different information input by the user, different instructions will be generated, which is not limited here.

After step S103 is performed, step S104 is performed: determining a presentation outcome of multimedia data based on the at least one voice feature and the voice operation instruction. Specifically, the electronic device determines, based on the language type and the voice operation instruction, an adapter file matching the language type. Specifically, the electronic device performs step S1201: obtaining a voice file and/or a subtitle file based on the voice operation instruction, as the content to be presented, where the voice file and/or the subtitle file matches the language type. Using the above example again, the electronic device may generate a file matching the language type for the voice information input by the user. For different input voice information, the above processes are different.

In the case that the voice instruction is an operation instruction for playing a video, for example "play the movie Avatar", the electronic device performs step S1301: obtaining a video voice file and/or a video subtitle file of a video, in the case that the voice operation instruction is a first voice operation instruction for playing the video. Using the above example again, the electronic device finds the movie "Avatar" on the network and loads an audio track file and a subtitle file of the movie. Since the electronic device identifies that the language type for the voice information is Chinese, the electronic device will load a Chinese audio track and a subtitle of simplified Chinese automatically. In practice, if the electronic device identifies that the language type is English, the electronic device will load an English audio track and an English subtitle automatically. Particularly, if the identified language type is Ukrainian and the electronic device does not find an audio track file and a subtitle file matching Ukrainian, the electronic device will load a world-ready audio track file and subtitle file automatically, for example the English audio track file and the English subtitle file; or load a Russian audio track file and an Russian subtitle file which are popular in eastern Europe to which Ukrainian belongs to.

In the case that the voice instruction is an operation instruction for playing music, for example "play the song Grandiose", the electronic device performs step S1302: obtaining a music subtitle file of music, in the case that the voice operation instruction is a second voice operation instruction for playing the music. Using the above example again, the electronic device finds the song "Grandiose" on the network and loads lyrics of the song. Since the electronic device identifies the language type for the voice information is Chinese, the electronic device will load lyrics of simplified Chinese. In practice, if the electronic device identifies that the language type is English, the electronic device will load English lyrics automatically; if the identified language type is Cantonese, the electronic device will load Cantonese lyrics automatically; and if the user requires to open a music file of plain music, the electronic device will load words introducing the music automatically, and of course the specific words will be changed accordingly based on the language type used by the user.

In the case that the voice instruction is an operation instruction for opening a web page, for example "open home page of Sina", the electronic device performs step S1303: obtaining a web page subtitle file of a web page, in the case that the voice operation instruction is a third voice operation instruction for opening the web page. Using the above example again, the electronic device directly opens the Home page of Sina. Since the electronic device identifies the language type for the voice information is Chinese, the electronic device will set a font of the file on the Sine web page as a simplified Chinese automatically. In practice, if the electronic device identifies the language type is English, the electronic device will set a language of the web page as English automatically, i.e., loading English words. If the electronic device identifies the language type is Cantonese, the electronic device will set a language of the web page as traditional Chinese automatically. The language type includes but not limits to the above three types, and the electronic device may load some news or entertaining information related to the above language types based on theses language types.

After any of step S1301, step S1302 and step S1303 is performed, step S105 is performed: presenting the multimedia data based on the presentation outcome. Using the above example again, the video, the music, the web page above or other information are presented via the multimedia interaction device.

A Second Embodiment

Figure 9:
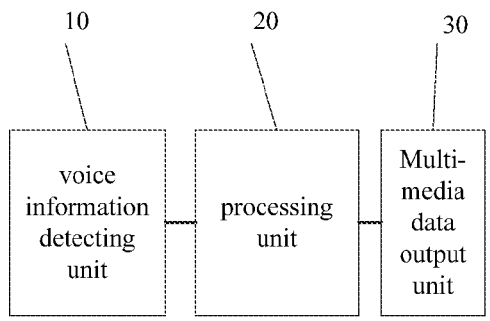
FIG. 9 is a structural diagram of an electronic device according to an embodiment of the present disclosure.

Referring to FIG. 9, an electronic device including a voice input/output unit is further provided according to an embodiment of the present disclosure based on the same inventive concept. The electronic device further includes a voice information detecting unit 10, a processing unit 20 and a multimedia data output unit 30.

The voice information detecting unit 10 is configured to detect to obtain voice information.

The processing unit 20 is configured to obtain at least one voice feature in the voice information by identifying the voice information; generate a voice operation instruction based on the voice information; determine a presentation outcome of multimedia data based on the at least one voice feature and the voice operation instruction, where the presentation outcome includes a content to be presented for the multimedia data and a presenting form for the content to be presented, and the presentation outcome matches the voice feature.

The multimedia data output unit 30 is configured to present the multimedia data based on the presentation outcome.

Optionally, the processing unit 20 is configured to determine a first input user for the voice information based on the voice information.

Optionally, the processing unit 20 is configured to generate voice reply information based on the voice operation instruction, as the content to be presented; and the processing unit 20 is configured to set a first output user for the voice reply information to be the first input user or a second input user corresponding to the first input user, where the first input user or the second input user is taken as the presenting form.

Optionally, the processing unit 20 is configured to determine, based on the voice information, an age feature of a first user inputting the voice information.

Optionally, the processing unit 20 is configured to generate voice reply information based on the voice operation instruction, as the content to be presented; and the processing unit 20 is configured to set a voice speed for the voice reply information to be a first voice speed corresponding to the age feature, as the presenting form.

Optionally, the processing unit 20 is configured to generate subtitle information based on the voice operation instruction, as the content to be presented; and the processing unit 20 is configured to set a subtitle display parameter for the subtitle information to be a first subtitle display parameter corresponding to the age feature, as the presenting form.

Optionally, the processing unit 20 is configured to determine, based on the voice information, a gender feature of a first user inputting the voice information.

Optionally, the processing unit 20 is configured to generate voice reply information based on the voice operation instruction, as the content to be presented; and the processing unit 20 is configured to set timbre for the voice reply information to be first timbre corresponding to the gender feature, as the presenting form.

Optionally, the processing unit 20 is configured to generate voice reply information based on the voice operation instruction, as the content to be presented; and the processing unit 20 is configured to set a first output user corresponding to the voice reply information to be a preset output user corresponding to the gender feature.

Optionally, the processing unit 20 is configured to determine a language type for the voice information based on the voice information.

Optionally, the processing unit 20 is configured to determine an adapter file matching the language type, based on the language type and the voice operation instruction.

Optionally, the processing unit 20 is configured to obtain a voice file and/or a subtitle file based on the voice operation instruction, as the content to be presented, where the voice file an/or the subtitle file matches the language type.

Optionally, the processing unit 20 is configured to obtain a video voice file and/or a video subtitle file of a video, in the case that the voice operation instruction is a first voice operation instruction for playing the video; obtain a music subtitle file of music, in the case that the voice operation instruction is a second voice operation instruction for playing the music; or obtain a web page subtitle file of a web page, in the case that the voice operation instruction is a third voice operation instruction for opening the web page.

The electronic device described above corresponds to the information processing method, and is not described in detail here.

With one or more technical solutions of the embodiments of the present disclosure, one or more technical effects hereinafter can be achieved:

With the above technical solutions of embodiments of the present disclosure, the voice feature of the user can be identified and a personalized presenting effect may be generated for the user based on the identified voice feature. Compared to a technical solution that the electronic device can only generate a relative fixed presenting effect, resulting in a bad experience and a bad interaction effect when the user uses the electronic device, the technical solutions according to the present disclosure can efficiently solve a problem that corresponding voice reply information can not be output based on a voice feature needed by a user, and can achieve a technical effect that corresponding voice replay is generated based on the voice feature of the user.

With the technical solutions of embodiments of the present disclosure, the voice feature of the user can be identified and a corresponding content is generated based on the identified voice feature. Compared to a technical solution that the electronic device can only generate a specified content based on a voice instruction, the technical solutions of the present disclosure can efficiently solve a technical problem that the electronic device can not automatically control an application program to set the presentation outcome based on the voice feature of the user, and can achieve a technical effect that the electronic device automatically controls to set the presentation outcome based on the identified voice feature.

Those skilled in the art should understand that the embodiments of the present disclosure may be embodied as a method, a system or a computer program product. Hence, in the present disclosure, only hardware embodiments, only software embodiments or embodiments of combination of hardware and software may be adopted. In addition, the present disclosure may be implemented as computer program products implemented on one or more computer available storage medium (including but not limiting to a magnetic disc memory, a CD-ROM or an optical memory or the like) containing computer available program codes.

The present disclosure is described by referring to flowcharts and/or block diagrams according to the methods, devices (systems) and computer program products of the embodiments of the present disclosure. It should be understood that each flow and/or block in flowcharts and/or block diagrams and a combination of flows and/or blocks in flowcharts and/or block diagrams may be implemented by computer program instructions. These computer program instructions may be provided to a general-purpose computer, a dedicated computer, an embedded processor or processing units of other programmable data processing devices to generate a machine, such that instructions executed by computers or processing units of other programmable data processing devices generate an apparatus for achieving functions specified in one or more flows in the flowcharts and/or one or more blocks in the block diagrams.

These computer program instructions may also be stored in computer readable memories guiding the computers or other programmable data processing devices to work in a certain mode, such that instructions stored in the computer readable memories generate a product including an instruction apparatus, which achieves functions specified in one or more flows in the flowcharts and/or one or more blocks in the block diagrams.

These computer program instructions may also be loaded to the computer or other programmable data processing devices, such that a series of operations are performed on the computer or other programmable devices to achieve processing performed by the computer, and thereby instructions executed on the computer or other programmable devices provide operations for achieving functions specified in one or more flows in the flowcharts and/or one or more blocks in the block diagrams.

Specifically, computer program instructions corresponding to the information processing method according to the embodiments of the present disclosure may be stored on storage medium such as an optical disc, a hard disc or a USB flash device; when being read or executed by an electronic device, the instructions enable the electronic device to perform the information processing method corresponding to the instructions, including:

detecting to obtain voice information;

obtaining at least one voice feature in the voice information by identifying the voice information;

generating a voice operation instruction based on the voice information;

determining a presentation outcome of multimedia data based on the at least one voice feature and the voice operation instruction, where the presentation outcome includes a content to be presented for the multimedia data and a presenting form for the content to be presented, and the presentation outcome matches the voice feature; and presenting the multimedia data based on the presentation outcome.

Optionally, computer instructions stored in the storage medium corresponding to the step of obtaining at least one voice feature in the voice information by identifying the voice information, when being executed, enable the electronic device to perform a step of: determining a first input user for the voice information based on the voice information.

Optionally, computer instructions stored in the storage medium corresponding to the step of determining a presentation outcome of multimedia data based on the at least one voice feature and the voice operation instruction, when being executed, enable the electronic device to perform a step of:

generating voice reply information based on the voice operation instruction, as the content to be presented; and setting a first output user for the voice reply information to be the first input user or a second input user corresponding to the first input user, where the first input user or the second input user is taken as the presenting form.

Optionally, computer instructions stored in the storage medium corresponding to the step of obtaining at least one voice feature in the voice information by identifying the voice information, when being executed, enable the electronic device to perform a step of: determining, based on the voice information, an age feature of a first user inputting the voice information.

Optionally, computer instructions stored in the storage medium corresponding to the step of determining a presentation outcome of multimedia data based on the at least one voice feature and the voice operation instruction, when being executed, enable the electronic device to perform a step of:

generating voice reply information based on the voice operation instruction, as the content to be presented; and setting a voice speed for the voice reply information to be a first voice speed corresponding to the age feature, as the presenting form.

Optionally, computer instructions stored in the storage medium corresponding to the step of determining a presentation outcome of multimedia data based on the at least one voice feature and the voice operation instruction, when being executed, enable the electronic device to perform a step of:

generating subtitle information based on the voice operation instruction, as the content to be presented; and setting a subtitle display parameter for the subtitle information to be a first subtitle display parameter corresponding to the age feature, as the presenting form.

Optionally, computer instructions stored in the storage medium corresponding to the step of obtaining at least one voice feature in the voice information by identifying the voice information, when being executed, enable the electronic device to perform a step of: determining, based on the voice information, a gender feature of a first user inputting the voice information.

Optionally, computer instructions stored in the storage medium corresponding to the step of determining a presentation outcome of multimedia data based on the at least one voice feature and the voice operation instruction, when being executed, enable the electronic device to perform a step of:

generating voice reply information based on the voice operation instruction, as the content to be presented; and setting timbre for the voice reply information to be first timbre corresponding to the gender feature, as the presenting form.

Optionally, computer instructions stored in the storage medium corresponding to the step of determining a presentation outcome of multimedia data based on the at least one voice feature and the voice operation instruction, when being executed, enable the electronic device to perform a step of:

generating voice reply information based on the voice operation instruction, as the content to be presented; and setting a first output user corresponding to the voice reply information to be a preset output user corresponding to the gender feature.

Optionally, computer instructions stored in the storage medium corresponding to the step of obtaining at least one voice feature in the voice information by identifying the voice information, when being executed, enable the electronic device to perform a step of: determining a language type for the voice information based on the voice information.

Optionally, computer instructions stored in the storage medium corresponding to the step of determining a presentation outcome of multimedia data based on the at least one voice feature and the voice operation instruction, when being executed, enable the electronic device to perform a step of: determining, based on the language type and the voice operation instruction, an adapter file matching the language type.

Optionally, computer instructions stored in the storage medium corresponding to the step of determining, based on the language type and the voice operation instruction, an adapter file matching the language type, when being executed, enable the electronic device to perform a step of: obtaining a voice file and/or a subtitle file based on the voice operation instruction, as the content to be presented, where the voice file and/or the subtitle file matches the language type.

Optionally, computer instructions stored in the storage medium corresponding to the step of obtaining a voice file and/or a subtitle file based on the voice operation instruction, when being executed, enable the electronic device to perform a step of:

obtaining a video voice file and/or a video subtitle file of a video, in the case that the voice operation instruction is a first voice operation instruction for playing the video;

obtaining a music subtitle file of music, in the case that the voice operation instruction is a second voice operation instruction for playing the music; or obtaining a web page subtitle file of a web page, in the case that the voice operation instruction is a third voice operation instruction for opening the web page.

Although preferred embodiments of the present disclosure are described, those skilled in the art may make additional alterations and changes to these embodiments once they know the basic creative concepts of the present disclosure. Therefore, the appended claims are intended to include the preferred embodiments and any alterations and changes falling within the scope of the present disclosure.

Apparently, those skilled in the art may make various changes and variations to the present disclosure without departing from the spirit and scope of the present disclosure. In this way, if these changes and variations to the present disclosure fall within a scope of the claims of the present disclosure and the equivalent technologies thereof, the present disclosure is intended to include these changes and variations.

The invention claimed is:

1. An information processing method applied in an electronic device, wherein the electronic device includes a processor, the method comprising:
   obtaining, by the processor, voice information;
   obtaining, by the processor, at least one voice feature in the voice information by identifying the voice information;
   generating, by the processor, a voice operation instruction based on the voice information;
   determining, by the processor, a presentation outcome of multimedia data based on the at least one voice feature and the voice operation instruction, wherein the presentation outcome matches the voice feature; and
   presenting, by the processor, the multimedia data based on the presentation outcome,
   wherein: the obtaining at least one voice feature in the voice information by identifying the voice information includes determining, based on the voice information, an age feature of a first user inputting the voice information, and
   the determining the presentation outcome of the multimedia data based on the at least one voice feature and the voice operation instruction includes:
      outputting voice reply information based on the voice operation instruction, and
      setting a voice speed for the voice reply information to be a first voice speed corresponding to the age feature.

2. The method according to claim 1, wherein:
   the obtaining the at least one voice feature in the voice information by identifying the voice information includes determining a voiceprint feature of the first user inputting the voice information based on the voice information,
   the determining the presentation outcome of the multimedia data based on the at least one voice feature and the voice operation instruction includes setting a first output user for the voice reply information to be the first user or a second user, and
   the second user corresponds to the first user.

3. The method according to claim 1, wherein the determining the presentation outcome of the multimedia data based on the at least one voice feature and the voice operation instruction includes:
   generating subtitle information based on the voice operation instruction, and
   setting a subtitle display parameter for the subtitle information to be a first subtitle display parameter corresponding to the age feature.

4. The method according to claim 1, wherein:
   the obtaining the at least one voice feature in the voice information by identifying the voice information includes determining, based on the voice information, a gender feature of the first user inputting the voice information,
   the determining the presentation outcome of the multimedia data based on the at least one voice feature and the voice operation instruction includes setting a timbre for the voice reply information to be a first timbre, and
   the first timbre corresponds to the gender feature.

5. The method according to claim 1, wherein:
   the obtaining the at least one voice feature in the voice information by identifying the voice information includes determining, based on the voice information, a gender feature of the first user inputting the voice information, and
   the determining the presentation outcome of the multimedia data based on the at least one voice feature and the voice operation instruction includes setting a first output user corresponding to the voice reply information to be a preset output user corresponding to the gender feature.

6. An information processing method applied in an electronic device, wherein the electronic device includes a processor, the method comprising:
   obtaining, by the processor, voice information;
   obtaining, by the processor, at least one voice feature in the voice information by identifying the voice information;
   generating, by the processor, a voice operation instruction based on the voice information;
   determining, by the processor, a presentation outcome of multimedia data based on the at least one voice feature and the voice operation instruction, wherein the presentation outcome matches the voice feature; and
   presenting, by the processor, the multimedia data based on the presentation outcome,
   wherein:
      the obtaining the at least one voice feature in the voice information by identifying the voice information includes determining, based on the voice information, a language type of the voice information,
      the determining the presentation outcome of the multimedia data based on the at least one voice feature and the voice operation instruction includes obtaining a voice file and/or a subtitle file based on the voice operation instruction, and
      the voice file and/or the subtitle file matches the language type.

7. The method according to claim 6, wherein the obtaining a voice file and/or a subtitle file based on the voice operation instruction includes:
- obtaining a video voice file and/or a video subtitle file of a video, in the case that the voice operation instruction is a first voice operation instruction for playing the video;
- obtaining a music subtitle file of music, in the case that the voice operation instruction is a second voice operation instruction for playing the music; or
- obtaining a web page subtitle file of a web page, in the case that the voice operation instruction is a third voice operation instruction for opening the web page.

8. An electronic device comprising a processor and a storage medium in which computer program instructions are stored, wherein the computer program instructions, when executed by the processor, cause the electronic device to:
- obtain voice information;
- obtain at least one voice feature in the voice information by identifying the voice information;
- generate a voice operation instruction based on the voice information;
- determine a presentation outcome of multimedia data based on the at least one voice feature and the voice operation instruction, wherein the presentation outcome matches the voice feature; and
- present the multimedia data based on the presentation outcome, wherein:
- obtaining the at least one voice feature in the voice information by identifying the voice information includes determining, based on the voice information, an age feature of a first user inputting the voice information,
- determining the presentation outcome of the multimedia data based on the at least one voice feature and the voice operation instruction includes:
    - outputting voice reply information based on the voice operation instruction, and
    - setting a voice speed for the voice reply information to be a first voice speed, and
- the first voice speed corresponds to the age feature.

9. The electronic device according to claim 8, wherein:
- obtaining the at least one voice feature in the voice information by identifying the voice information includes determining, based on the voice information, a voiceprint feature of the first user inputting the voice information,
- determining the presentation outcome of the multimedia data based on the at least one voice feature and the voice operation instruction includes: setting a first output user for the voice reply information to be the first user or a second user, and
- the second user corresponds to the first user.

10. The electronic device according to claim 8, wherein determining the presentation outcome of the multimedia data based on the at least one voice feature and the voice operation instruction includes:
- generating subtitle information based on the voice operation instruction, and
- setting a subtitle display parameter for the subtitle information to be a first subtitle display parameter corresponding to the age feature.

11. The electronic device according to claim 8, wherein:
- obtaining the at least one voice feature in the voice information by identifying the voice information includes determining, based on the voice information, a gender feature of the first user inputting the voice information, and
- determining the presentation outcome of the multimedia data based on the at least one voice feature and the voice operation instruction includes setting a timbre for the voice reply information to be a first timbre corresponding to the gender feature.

12. The electronic device according to claim 8, wherein:
- obtaining the at least one voice feature in the voice information by identifying the voice information includes determining, based on the voice information, a gender feature of the first user inputting the voice information,
- determining the presentation outcome of the multimedia data based on the at least one voice feature and the voice operation instruction includes setting a first output user corresponding to the voice reply information to be a preset output user, and
- the preset output user corresponds to the gender feature.

13. The electronic device according to claim 8, wherein:
- obtaining the at least one voice feature in the voice information by identifying the voice information includes determining a language type for the voice information based on the voice information, and
- determining the presentation outcome of the multimedia data based on the at least one voice feature and the voice operation instruction includes obtaining a voice file and/or a subtitle file based on the voice operation instruction,
- the voice file and/or the subtitle file matches the language type.

14. The electronic device according to claim 13, wherein the obtaining the voice file and/or the subtitle file based on the voice operation instruction includes:
- obtaining a video voice file and/or a video subtitle file of a video, in the case that the voice operation instruction is a first voice operation instruction for playing the video,
- obtaining a music subtitle file of music, in the case that the voice operation instruction is a second voice operation instruction for playing the music, or
- obtaining a web page subtitle file of a web page, in the case that the voice operation instruction is a third voice operation instruction for opening the web page.

* * * * *